June 8, 1937.    C. S. McCANN    2,083,272
SHOCK ABSORBER
Filed Feb. 17, 1936

INVENTOR
CHARLES S. McCANN
BY
ATTORNEYS

Patented June 8, 1937

2,083,272

UNITED STATES PATENT OFFICE 2,083,272

SHOCK ABSORBER

Charles S. McCann, Dayton, Ohio, assignor to General Motors Corporation, Detroit, Mich., a corporation of Delaware Application February 17, 1936, Serial No. 64,190

4 Claims. (Cl. 267—8)

This invention relates to improvements in hydraulic shock absorbers, and particularly to the fluid flow control devices therefor.

It is among the objects of the present invention to provide a hydraulic shock absorber, capable of controlling the relative movements between the axle and frame of a vehicle with a proper minimum resistance while said vehicle is being operated over a moderately rough roadbed and no extensive body movement obtains, the shock absorber, however, being adapted automatically to adjust itself to afford greater resistance to such relative movements when they are extensive and at an accelerated rate.

A further object of the present invention is to provide a hydraulic shock absorber capable of affording a maximum resistance in response to more extensive and accelerated movements of the vehicle body or the axle.

These objects and others are attained by providing a shock absorber, having a fluid reservoir and a fluid displacement chamber in communication with each other through a duct, with inertia means movably carried in the shock absorber and with a spring-loaded static valve which, independent of the inertia mass, normally closes the duct, but adapted to be actuated by fluid pressure to open said duct and to be engaged and actuated by the inertia mass to increase its restriction to the fluid flow from said duct into the reservoir, only when said mass moves in response to accelerations in the movement of the shock absorber.

From this it may be seen that the features of the invention reside in the provision of a pressure actuated static valve which, in response to pressure only provides a properly restricted fluid flow to control moderate movements of the vehicle axle and body while the vehicle is being operated over a comparatively smooth roadbed, said valve being adapted, however, to be actuated to increase its restriction to fluid flow when the inertia mass is moved in response to accelerations in the movement of the vehicle body resulting when the vehicle is operated over a comparatively rough highway or roadbed.

Further objects and advantages of the present invention will be apparent from the following description, reference being had to the accompanying drawing, in which a preferred embodiment of one form of the present invention is clearly shown.

Figure 1:
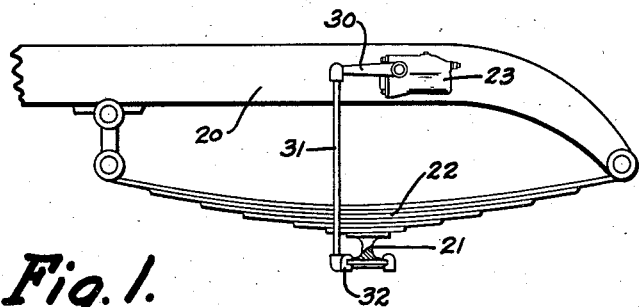
Fig. 1 is a fragmentary side view of a vehicle chassis, a shock absorber equipped with the present invention being shown applied thereto. In this figure the roadwheel of the vehicle has been omitted for the sake of clearness.

Referring to the drawing, the numeral 20 designates the frame of the vehicle, which is supported upon the vehicle axle 21 by vehicle springs 22.

The shock absorber as a whole is designated by the numeral 23, said shock absorber comprising a casing 24 providing a fluid reservoir 25 and a cylinder 26.

A rocker shaft 27 is journalled transversely of the casing, one end thereof extending to the exterior thereof and having the shock absorber operating arm 30 secured thereto. The free end of this arm has one end of a link 31 connected therewith, the other end of said link being attached to the vehicle axle 21 by the clamping member 32.

Within the shock absorber the rocker shaft 27 has an operating cam 33 secured thereto, the free end of which lies adjacent the open end of the cylinder 26.

A piston 35 is provided in the cylinder, forming the fluid displacement chamber 36 therein. This piston is urged to engage the free end of the operating cam 33 by a spring 37 interposed between the piston and the closed end of the cylinder 26. The piston 35 has a passage 38 providing for the transfer of fluid from one side of the piston to the other. An annular ridge 39, on the piston head portion around the passage 38, forms a valve-seat engaged by the intake valve 40, said valve being urged yieldably to engage said seat by the spring 41 interposed between the valve and a cage member 42. This cage 42 is pressed against the inside surface of the piston head by the spring 37.

Intake valve 40 has a tubular body portion slidably supporting the pressure release valve 45, the head 46 thereof being yieldably urged to engage the intake valve 40 by a spring 47 interposed between the intake valve and an abutment collar 48 carried at one end of the pressure release valve 45. This valve mechanism including both the intake valve 40 and the pressure release valve 45 forms the subject matter of the patent to George W. Elsey, No. 1,865,460, dated July 5, 1932.

The shock absorber casing 24 has an opening 50 leading from the exterior of the shock absorber into the reservoir 25. This opening is interiorly threaded to receive the valve cage 51 having an annular groove 52 in its outer surface, which groove lies within the confines of the opening 50 when the valve cage 51 is screwed into proper position in the casing. The annular groove 52 is in communication with a central through-passage in the valve cage 51 by transverse passages 53. This central through-passage in the valve-cage 51 has three portions of different diameter, the inner one designated by the numeral 54, being the portion of the passage more adjacent the reservoir 25, the second, smallest diameter or intermediate portion 55, and the outer, larger diameter portion 56 which communicates with the exterior of the shock absorber. The larger diameter portion 56 of the valve cage 51 is closed by the screw plug 57, forming a chamber 58. The portions 54 and 55 being of different diameters, provide a shoulder 59 within the central passage of the screw plug 51.

Figure 2:
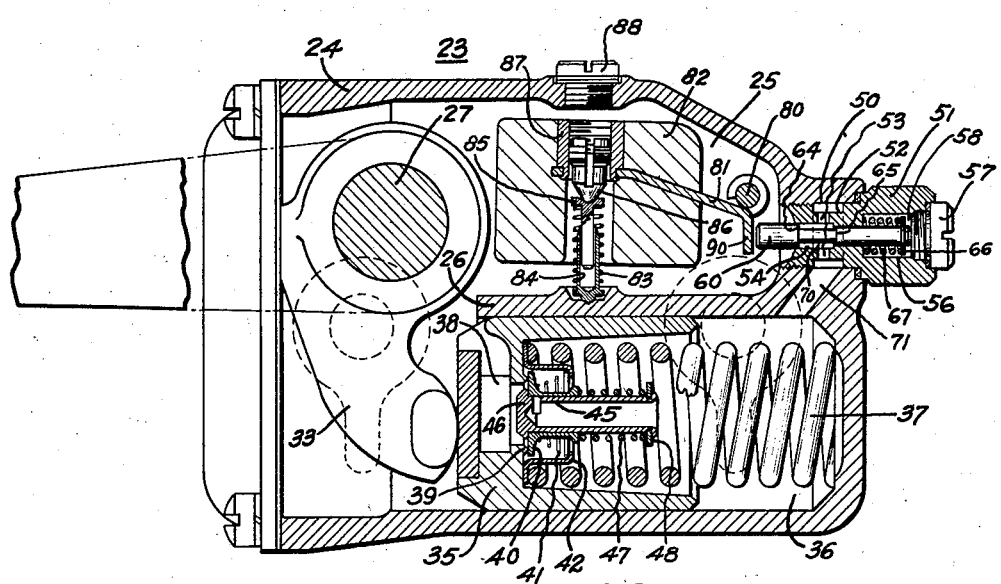
Fig. 2 is a longitudinal sectional view taken through the center of the shock absorber, certain parts being shown in elevation more clearly to illustrate them.
Figure 3:
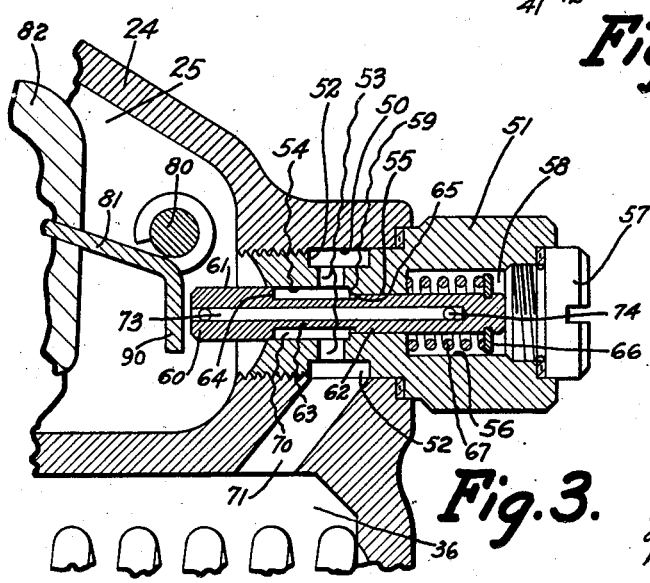
Fig. 3 is an enlarged fragmentary view showing the static valve and a portion of the inertia mass adapted to actuate it under certain conditions.

The static valve 60 is slidably supported within the central passage of valve cage 51, this valve having three different diameter portions, namely, the portion 61 which slidably fits within the passage portion 54, the portion 62 which slidably fits within the passage portion 55 and an intermediate portion 63 which is of lesser diameter than either portion 61 or 62 of said valve, thus providing two shoulders, one designated by the numeral 64 more adjacent the fluid reservoir 25 of the shock absorber and of greater area than the other shoulder 65 which is more remote from the reservoir 25, as seen in Figs. 2 and 3.

The smaller diameter intermediate valve portion 63 forms an annular chamber 70 within the valve cage 51, which annular chamber is in communication with a passage 71 leading from the displacement chamber 36 to the annular groove 52 in the valve cage, which annular groove, as has been mentioned, communicates with the interior of the valve cage 51 through the passages 53. An abutment collar 66 is secured to the valve 60 at the end extending into the chamber 58, one end of a spring 67 resting upon said abutment collar, the other end against the bottom surface of the chamber 58 whereby the valve 60 is urged toward the right to engage the screw 57, the shoulder 64 of valve 60 closing the passage portion 54 when the valve is in this normal position. Valve 60 has a central passage 73, one end communicating with the chamber 58 through the transverse passage 74, the other end opening into the reservoir 25. This prevents any build-up of suction or pressure within the chamber 58 due to the reciprocation of the end of the valve stem in said chamber.

A cross-pin 80 is provided in the reservoir 25 of the shock absorber. A bracket 81 is pivotally supported by said cross-pin 80, this bracket being attached to and forming a part of the inertia mass 82 which is yieldably suspended within the shock absorber by a spring 83 interposed between the cylinder portion 84 and the piston portion 85 of a dashpot. It will be noted that the cylinder portion 84 of the dashpot, rests upon the casing of the shock absorber, the piston portion 85 of said dashpot forming a base supporting the tapered end of an adjustable screw 86 threadedly received by a collar 87 carried by the inertia mass 82. A removable screw 88 in the casing, aligned with the adjustable screw 86 in the weight, permits access to this adjustable screw from the exterior of the shock absorber for adjustment purposes. A finger 90 of the bracket 81 of inertia mass 82 lies in alignment with and juxtaposition to the static valve 60, being normally spaced therefrom and not engageable therewith, even though the valve be actuated by fluid pressure, as will be described. It is desirable that the finger 90 of the inertia mass engage the static valve 60 only when the inertia mass 82 is actuated in response to accelerations in the upward movement of the vehicle frame 20 to which the shock absorber is attached.

Having described the shock absorber structurally, its functions will now be set forth.

When the vehicle is being operated over a moderately rough highway and when the roadwheel strikes a moderate obstruction or hump in the highway, it is thrown upwardly, compressing the spring 22. In response to such upward movement of the roadwheel and consequently the axle 21 of the vehicle, the link 31 will actuate the shock absorber operating arm 30 clockwise, resulting in a similar movement of the rocker shaft 37 and its cam 33. In response to such movement of cam 33, spring 37 will move the piston 35 toward the left as regards Figs. 1 and 2, causing the piston 35 to follow the movement of the operating cam 33. Under these circumstances fluid will move the intake valve 40 from its seat to establish a substantially unrestricted flow of fluid from the reservoir 25 through piston passage 38 past the valve 40 into the displacement chamber 36.

The limit of compression of spring 22 under these circumstances having been reached, it will tend to rebound to its normal load position, resulting in a counter-clockwise movement of the operating arm 30, its shaft 27 and the operating cam 33. Now the piston 35 is urged into the cylinder by the operating cam 33, exerting a pressure upon the fluid within the displacement chamber 36 which, when attaining a predetermined value, will move intake valve 60 toward the left as regards Figs. 2 and 3 against the effect of spring 67. It will be noted that the static valve 60, having bold shoulders 64 and 65 of different areas, will consequently be actuated by differential pressure effect. Naturally the fluid pressure from displacement chamber 36, acting through passage 71, annular groove 52 and transverse passages 53 against said shoulders 64 and 65 will exert a predominating pressure toward the left, the shoulder 64 being equal to the sum of the immovable shoulder 59 and the shoulder 65 of the valve. Movement of the valve 60 toward the left results, due to this larger area of the valve shoulder 64, thereby moving the outer edge of shoulder 64 beyond the confines of the valve cage 51 and establishing a restricted flow of fluid from the annular chamber 70 within the valve cage into the reservoir through the orifice thus created. This restriction to fluid flow causes the shock absorber to offer the proper resistance to this rebounding movement of the spring 22.

If, however, the vehicle is operated over a comparatively rough highway and a larger obstruction is met by the roadwheel, spring 22 will be compressed more extensively, resulting in a greater rebound movement thereof and an exertion of greater pressure upon the fluid in displacement chamber 36 during this rebounding movement. Under these circumstances if the static valve 60 cannot properly relieve this higher fluid pressure in chamber 36, then valve 45 is actuated so that its head 46 is moved from engagement with the intake valve 40, thus establishing an additional flow of fluid from chamber 36 through the pressure release valve 45, past the intake valve 40, through the piston passage 38 into the reservoir 25.

In response to obstructions being met by the roadwheel and compression of spring 22, the vehicle frame 20 supporting the vehicle body will be set into motion. If the upward motion of the vehicle frame 20 becomes sufficiently extensive and sufficiently accelerated, inertia mass 82 will be actuated relatively to the casing 24, the movement thereof being counter-clockwise as regards pivot pin 80. The movement of the inertia mass and thus the finger 90 of bracket 81 will cause said finger to engage the static valve 60, moving it toward the right against the effect of pressure upon the shoulder 64 of said valve. This movement of valve 60 by the inertia mass reduces the orifice presented between shoulder 64 of said valve and the end of the valve cage 51, consequently increasing its restriction to fluid flow and thereby increasing the resistance offered by the shock absorber to this movement of the body carrying frame 20 of the vehicle.

It will be noted that the valve 60 when actuated by pressure will not engage the finger 90 of the inertia mass 82, said finger engaging said valve only in response to movement of the inertia mass 82 counter-clockwise. Consequently the static valve is normally independent of and entirely unaffected by the inertia mass. It is only when the inertia mass is actuated in response to accelerative movements of the shock absorber upwardly that the inertia mass can engage and thereby adjust the static valve to alter its control of fluid flow from the displacement chamber 36.

From the aforegoing it will be seen that applicant has provided a hydraulic shock absorber, adapted to furnish the proper minimum resistance through the agency of its static valve while the vehicle is being operated over a moderately rough roadbed and no extensive accelerated body movement occurs, the shock absorber, however, being adapted, by means of the inertia mass 82, automatically to adjust itself to afford a greater resistance when it adjusts the static valve as the body of the vehicle moves at an accelerated rate. The shock absorber also provides a maximum resistance in response to more extensive movements of the vehicle axle.

While the embodiment of the present invention, as herein disclosed, constitutes a preferred form, it is to be understood that other forms might be adopted, all coming within the scope of the claims which follow.

What is claimed is as follows:

1. In a hydraulic shock absorber having a fluid reservoir and a fluid displacement chamber in communication with each other through a duct, the combination with a control valve having opposed areas of different size exposed to fluid pressure in the displacement chamber, the predominating area causing a predetermined fluid pressure to actuate the valve for opening the duct; a spring yieldably urging the valve to close the duct; and an inertia mass normally disengaged from the valve and adapted to be moved by accelerations in the upward movement of the shock absorber to engage and actuate the valve to increase its restriction to the flow of fluid through the duct.

2. In a hydraulic shock absorber having a fluid reservoir and a fluid displacement chamber in communication with each other through a duct, the combination with a differential area valve normally closing the duct and adapted to open said duct in response to pressure therein; a spring yieldably urging the valve into normal position; and an inertia valve pivotally supported in the shock absorber and having means normally spaced from, but adapted to be engaged by the valve when it is actuated to open the duct.

3. In a hydraulic shock absorber having a fluid reservoir and a fluid displacement chamber in communication with each other through a duct, the combination with a spring-loaded, differential area pressure relief valve normally closing said duct; a bracket pivotally carried by the shock absorber, having angularly arranged arms, one of which lies in the path of movement of the said valve but is normally spaced therefrom, the other having an inertia mass attached thereto; and a spring yieldably holding the bracket and its inertia mass in normal position.

4. In a hydraulic shock absorber having a fluid reservoir and a fluid displacement chamber in communication with each other through a duct, the combination with a spring-loaded valve normally closing said duct and adapted to be actuated by fluid pressure to open the duct; a bracket pivotally carried in the shock absorber and having angularly arranged, integral arms, one of which lies in the path of movement of the valve; a weight attached to the other arm of the bracket; and a spring yieldably supporting the weight so that the said one arm of the bracket is normally spaced from the valve.

CHARLES S. McCANN.